US012549323B1

(12) United States Patent
Saulnier et al.

(10) Patent No.: US 12,549,323 B1
(45) Date of Patent: *Feb. 10, 2026

(54) PERMITTING WIDEBAND SIMULTANEOUS TRANSMIT AND RECEIVE COMMUNICATIONS ON OVERLAPPING FREQUENCY BANDS

(71) Applicant: Resonant Sciences, LLC, Dayton, OH (US)

(72) Inventors: Al Saulnier, Laura, OH (US); Randall T Clark, Xenia, OH (US); Jeremy Micah North, Dayton, OH (US); Doug Sicker, Louisville, CO (US)

(73) Assignee: RESONANT SCIENCES, LLC, Beavercreek, OH (US)

( * ) Notice: Subject to any disclaimer, the term of this patent is extended or adjusted under 35 U.S.C. 154(b) by 522 days.

This patent is subject to a terminal disclaimer.

(21) Appl. No.: 17/358,997

(22) Filed: Jun. 25, 2021

Related U.S. Application Data

(60) Provisional application No. 63/063,497, filed on Aug. 10, 2020, provisional application No. 63/044,396, filed on Jun. 26, 2020.

(51) Int. Cl.
*H04W 72/23* (2023.01)
*H04L 5/14* (2006.01)
*H04W 72/0453* (2023.01)

(52) U.S. Cl.
CPC ....... *H04L 5/1461* (2013.01); *H04W 72/0453* (2013.01); *H04W 72/23* (2023.01)

(58) Field of Classification Search
CPC ....... H04L 5/1461; H04L 5/14; H04L 5/0073; H04W 72/0453; H04W 72/042;
(Continued)

(56) References Cited

U.S. PATENT DOCUMENTS 4,035,734 A 7/1977 Flormann et al.
4,327,438 A 4/1982 Baier et al.
(Continued)

FOREIGN PATENT DOCUMENTS

EP 2868004 B1 2/2018
WO 2013062547 A1 5/2013

OTHER PUBLICATIONS

Carusone et al.; "Analogue Adaptive Filters: Past and Present"; IEE Proc., Circuits Devices System; vol. 147, No. 1; Feb. 2000.
(Continued)

*Primary Examiner* — Hassan A Phillips
*Assistant Examiner* — Prenell P Jones
(74) *Attorney, Agent, or Firm* — GrayRobinson, P.A.

(57) ABSTRACT

Wideband simultaneous transmit and receive communications on overlapping frequency bands may be achieved by communicating via a communication device having a transmit signal path and a receive signal path. The transmit signal path and receive signal path are operable to transmit and receive simultaneously at the same frequency. A first remote communication device communicates over a first interference suppressed band using a first channel in the transmit signal path and receive signal path. A second remote communication device communicates over a second interference suppressed band using a second channel in the transmit signal path and receive signal path.

17 Claims, 8 Drawing Sheets

(58) Field of Classification Search
CPC ... H04W 88/08; H04W 76/00; H04W 72/082; H04W 74/06
See application file for complete search history.

(56) References Cited

U.S. PATENT DOCUMENTS

| | | | |
|---|---|---|---|
| 4,475,246 A | 10/1984 | Batlivala et al. | |
| 5,481,572 A | 1/1996 | Skold et al. | |
| 5,912,644 A | 6/1999 | Wang | |
| 5,963,847 A | 10/1999 | Ito et al. | |
| 6,912,644 B1 | 6/2005 | O'Connor et al. | |
| 7,555,219 B2 | 6/2009 | Cox et al. | |
| 7,633,435 B2 | 12/2009 | Meharry et al. | |
| 7,756,002 B2* | 7/2010 | Batra | H04B 1/7163 370/208 |
| 8,135,339 B2 | 3/2012 | Ranson et al. | |
| 8,285,201 B2 | 10/2012 | Gore et al. | |
| 8,503,926 B2 | 8/2013 | Gainey et al. | |
| 8,571,470 B2 | 10/2013 | Ranson et al. | |
| 8,630,211 B2 | 1/2014 | Gainey et al. | |
| 8,725,067 B2 | 5/2014 | Ahn et al. | |
| 8,755,750 B2 | 6/2014 | Cox et al. | |
| 8,868,006 B2 | 10/2014 | Cox et al. | |
| 8,879,433 B2 | 11/2014 | Khojastepour et al. | |
| 9,209,840 B2 | 12/2015 | Cox | |
| 9,237,043 B1* | 1/2016 | Beals | H04B 1/525 |
| 9,461,698 B2 | 10/2016 | Moffatt et al. | |
| 9,503,304 B2* | 11/2016 | Lee | H04L 27/2273 |
| 10,218,490 B1 | 2/2019 | Yang et al. | |
| 10,243,719 B2* | 3/2019 | Bharadia | H04B 1/525 |
| 10,389,509 B2* | 8/2019 | Stirling-Gallacher | H04L 5/1438 |
| 11,057,067 B1 | 7/2021 | Hickle et al. | |
| 11,362,694 B1 | 6/2022 | Laufer et al. | |
| 11,405,171 B2* | 8/2022 | Khude | H04W 74/0816 |
| 11,528,049 B2* | 12/2022 | Lee | G06N 3/02 |
| 2001/0029186 A1* | 10/2001 | Canyon | H04M 1/725 455/462 |
| 2002/0061081 A1* | 5/2002 | Richards | H04B 1/719 375/E1.001 |
| 2004/0032904 A1 | 2/2004 | Orlik et al. | |
| 2005/0058230 A1* | 3/2005 | Thomas | H04B 1/126 375/347 |
| 2005/0201268 A1* | 9/2005 | Aoki | H04L 25/0226 370/208 |
| 2006/0251148 A1* | 11/2006 | Welborn | H04B 1/71635 375/130 |
| 2007/0121546 A1* | 5/2007 | Zuckerman | H04L 5/023 370/329 |
| 2008/0181095 A1* | 7/2008 | Zangi | H04L 27/2647 370/208 |
| 2009/0175365 A1 | 7/2009 | Jun | |
| 2010/0208712 A1* | 8/2010 | Wax | H04B 17/345 370/338 |
| 2011/0007852 A1 | 1/2011 | Kimata | |
| 2011/0170473 A1 | 7/2011 | Proctor, Jr. et al. | |
| 2011/0286605 A1* | 11/2011 | Furuta | G10L 21/0208 381/71.1 |
| 2012/0170482 A1* | 7/2012 | Hwang | H04B 13/005 370/336 |
| 2012/0213312 A1* | 8/2012 | Futatsugi | H04L 27/26265 375/296 |
| 2013/0244710 A1 | 9/2013 | Nguyen et al. | |
| 2013/0314271 A1 | 11/2013 | Braswell et al. | |
| 2014/0044107 A1* | 2/2014 | Jacob | H04L 25/03006 370/336 |
| 2014/0153628 A1* | 6/2014 | Vojcic | H03M 13/6325 375/227 |
| 2014/0194054 A1 | 7/2014 | Kim | |
| 2014/0204808 A1 | 7/2014 | Choi et al. | |
| 2015/0229461 A1* | 8/2015 | DiFazio | H04L 5/14 370/280 |
| 2015/0269449 A1 | 9/2015 | Kosaki | |
| 2015/0270865 A1 | 9/2015 | Polydoros et al. | |
| 2015/0326380 A1 | 11/2015 | Verbin et al. | |
| 2016/0254007 A1* | 9/2016 | Guo | H03G 5/005 704/226 |
| 2017/0006633 A1* | 1/2017 | Zhang | H04W 72/20 |
| 2017/0207863 A1* | 7/2017 | Shariat | H04L 5/0046 |
| 2017/0257868 A1* | 9/2017 | Wang | H04W 72/0466 |
| 2017/0280351 A1* | 9/2017 | Skaaksrud | G08B 25/08 |
| 2018/0020457 A1* | 1/2018 | Noh | H04W 52/241 |
| 2018/0076847 A1* | 3/2018 | Ju | H04L 25/0224 |
| 2019/0097707 A1 | 3/2019 | Cox et al. | |
| 2019/0207738 A1 | 7/2019 | Son et al. | |
| 2019/0274030 A1 | 9/2019 | Bidot et al. | |
| 2019/0310681 A1 | 10/2019 | Shainwald et al. | |
| 2020/0053835 A1 | 2/2020 | Ye et al. | |
| 2020/0099504 A1 | 3/2020 | Erricolo et al. | |
| 2020/0221402 A1* | 7/2020 | Zhang | H04W 74/0833 |
| 2020/0245363 A1* | 7/2020 | Kim | H04W 74/0833 |
| 2020/0252115 A1* | 8/2020 | Paramesh | H04B 7/0617 |
| 2020/0252806 A1 | 8/2020 | Yerramalli et al. | |
| 2020/0274686 A1* | 8/2020 | Khude | H04W 74/0816 |
| 2021/0028897 A1 | 1/2021 | Park et al. | |
| 2021/0273773 A1 | 9/2021 | et al. | |
| 2021/0274381 A1 | 9/2021 | Teyeb | |
| 2021/0377912 A1 | 12/2021 | Hamss et al. | |
| 2022/0094512 A1 | 3/2022 | Kolodziej | |
| 2022/0150730 A1 | 5/2022 | Freda et al. | |
| 2022/0159674 A1 | 5/2022 | Deng et al. | |

OTHER PUBLICATIONS

Nawankwo et al.; "A Survey of Self-Interference Management Techniques for Single Frequency Full Duplex Systems"; IEEE Access; vol. 6; pp. 30242-30268; 2018.

Office Action of Dec. 7, 2022 for U.S. Appl. No. 17/358,939.

* cited by examiner

FIG. 10 represents the notional broadcast range of the device on F2

*FIG. 11*

PERMITTING WIDEBAND SIMULTANEOUS TRANSMIT AND RECEIVE COMMUNICATIONS ON OVERLAPPING FREQUENCY BANDS

CROSS-REFERENCE TO RELATED APPLICATIONS

This claims the benefit of priority to Application No. 63/044,396, filed Jun. 26, 2020, and Application No. 63/063,497, filed Aug. 10, 2020. These prior applications are incorporated by reference in their entirety.

FIELD

This relates to the field of communications and, more particularly, to communications between simultaneous transmit and receive (STAR) devices.

BACKGROUND

Communication devices communicate with each other over a frequency band in the radio or microwave frequency range. To prevent interference between devices, government agencies regulate the frequency bands that are available. Unfortunately, because frequency bandwidth is set by the laws of physics, new bandwidth cannot be created. To overcome this obstacle, people have learned to use frequency bands efficiently. But, because the demand for wireless communication and the amount of data being transmitted is increasing, there is a need to increase the number of users assigned to a particular band.

Radio communications take place on a prescribed band or channel within the spectrum. In order for data to be transmitted and received by radio devices, the channel is often divided into a transmission band and receiving band, which requires more bandwidth than would be required if the data could be transmitted and received over the same band simultaneously.

In recent years, people have developed wireless devices called STAR devices that can simultaneously transmit and receive at the same frequency. If these STAR devices could be used in modern communication networks, such as radio or cellular networks, they would free significant amounts of bandwidth. Such STAR devices have, however, found limited commercial use because they are usually narrowband and made for specialized purposes.

BRIEF SUMMARY

It would be beneficial to find a way to use STAR devices in modern communication networks to free bandwidth that could be used for other purposes. The devices, methods, and systems described here permit the use of these devices and set forth an advantageous protocol for permitting wideband simultaneous transmit and receive communications on overlapping frequency bands.

An example of a communication device includes a transmit signal path and a receive signal path, the transmit signal path and receive signal path being operable to transmit and receive simultaneously at the same frequency. A first channel in the transmit signal path and receive signal path is configured to communicate with a first communication device over a first interference suppressed band. A second channel in the transmit signal path and receive signal path is configured to communicate with a second communication device over a second interference suppressed band.

The communication device may include one or more of the following additional features.

The first interference suppressed band and second interference suppressed band may overlap.

The communication device may also include a third channel in the transmit signal path and receive signal path, the third channel being configured to initiate communications between the first communication device and second communication device by sending and receiving a polling signal.

The communication device may also include a first transceiver that operates the first channel and a second transceiver that operates the second channel.

The communication device may also include a first transceiver that operates the first channel and a second transceiver that operates the second channel. The first transceiver includes a first interference suppressor that suppresses simultaneously transmitted and received interference in the first transceiver. The second transceiver includes a second interference suppressor that suppresses simultaneously transmitted and received interference in the second transceiver.

The communication device may also include processing circuitry configured to generate a communication sub-band and an initiation sub-band in the first channel. The initiation sub-band has a lower bandwidth than the communication sub-band and operates at a lower power than the communication sub-band.

An example of a communication method includes communicating via a communication device having a transmit signal path and a receive signal path. The transmit signal path and receive signal path are operable to transmit and receive simultaneously at the same frequency. The method further includes communicating with a first remote communication device over a first interference suppressed band using a first channel in the transmit signal path and receive signal path and communicating with a second remote communication device over a second interference suppressed band using a second channel in the transmit signal path and receive signal path.

The communication method may include one or more of the following additional features.

The first interference suppressed band and second interference suppressed band may overlap.

The communication method may also include a third channel in the transmit signal path and receive signal path, the third channel being configured to initiate communications between the first remote communication device and second remote communication device by sending and receiving a polling signal.

A first transceiver may operate the first channel and a second transceiver may operate the second channel.

A first transceiver may operate the first channel and a second transceiver may operate the second channel. The first transceiver includes a first interference suppressor that suppresses simultaneously transmitted and received interference in the first transceiver. The second transceiver includes a second interference suppressor that suppresses simultaneously transmitted and received interference in the second transceiver.

The communication method may also include generating a communication sub-band and an initiation sub-band in the first channel, the initiation sub-band having a lower bandwidth than the communication sub-band and operating at a lower power than the communication sub-band.

Another example of a communication method includes operating a network of simultaneous transmit and receive (STAR) communication devices that communicate with each other simultaneously on a common frequency band by: (a) executing a first channel on the frequency band, the first channel having interference between a first channel transmitter and a first channel receiver suppressed by a first interference suppressor; and (b) executing a second channel on the frequency band, the second channel having interference between a second channel transmitter and a second channel receiver suppressed by a second interference suppressor.

The communication method may include one or more of the following additional features.

A network controller may execute the first channel and second channel by providing control signals to the communication devices.

The communication method may also include executing a third channel on the frequency band, the third channel having interference between a third channel transmitter and a third channel receiver suppressed by a third interference suppressor, wherein a network controller provides control signals to the communication devices over the third channel.

The communication method may also include generating a communication sub-band and an initiation sub-band in the first channel, the initiation sub-band having a lower bandwidth than the communication sub-band and operating at a lower power than the communication sub-band.

The communication method may also include generating a first communication sub-band and a first initiation sub-band in the first channel, the first initiation sub-band having a lower bandwidth than the first communication sub-band and operating at a lower power than the first communication sub-band; and generating a second communication sub-band and a second initiation sub-band in the second channel, the second initiation sub-band having a lower bandwidth than the second communication sub-band and operating at a lower power than the second communication sub-band.

A network controller may execute the first channel and second channel by providing control signals to the communication devices over a third channel, the first channel, second channel, and third channel being on the same frequency band.

The first channel and second channel may occupy the same frequency band.

The STAR communication devices may communicate full duplex data transfers at the same frequency.

DETAILED DESCRIPTION OF EXAMPLE EMBODIMENTS

This disclosure describes exemplary embodiments, but not all possible embodiments of the devices, systems and methods. Where a particular feature is disclosed in the context of a particular example, that feature can also be used, to the extent possible, in combination with and/or in the context of other examples. The devices, systems, and methods may be embodied in many different forms and should not be construed as limited to only the examples described here.

Figure 1:
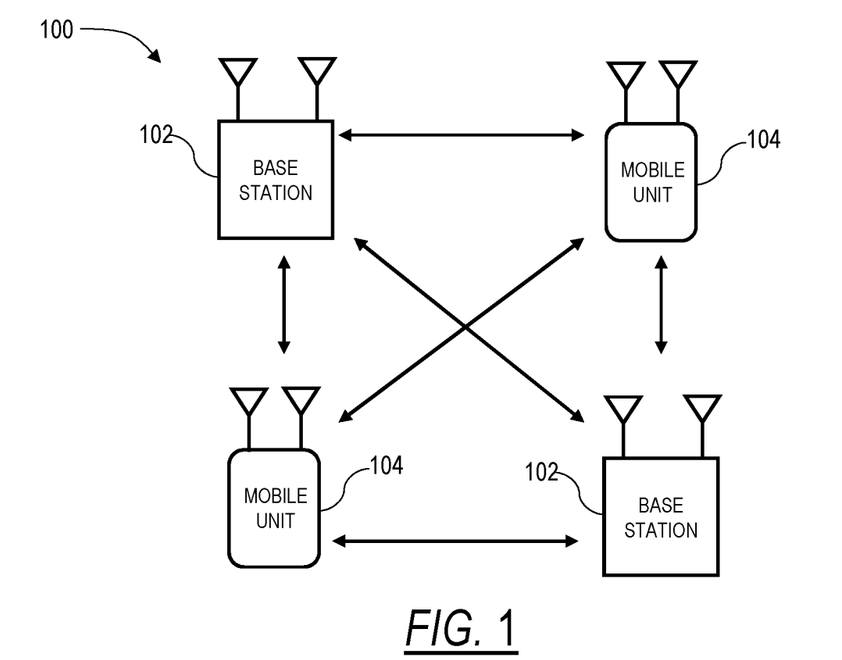
FIG. 1 is a block diagram of an example of a communication network.

Referring to FIG. 1, a communications network 100 may include at least one base station 102 that communicates with at least one mobile unit 104. The base station 102 is a fixed-location point of communication for devices within the network. The base station 102 receives and transmits signals in the network to devices such as mobile units 104.

A mobile unit 104 may be a mobile communication device such as cellular phone, tablet, computer, radio, and the like. The mobile unit 104 may include the typical hardware and software components one would find in modern mobile communication devices, such as a processor, memory, a keypad, a screen, and I/O ports, among others. In any example, the mobile unit 104 is a device capable of receiving and transmitting radio frequency signals wirelessly.

In the communications network, the base station 102 may communicate with the mobile units 104 and mobile units 104 may communicate with other mobile units 104 and base stations 102 as illustrated by the arrows in FIG. 1.

The network may be a wired or wireless network that operates using radio frequency communications technology such as a radio network, cellular network, computer network, Internet network, or the like.

Figure 2:
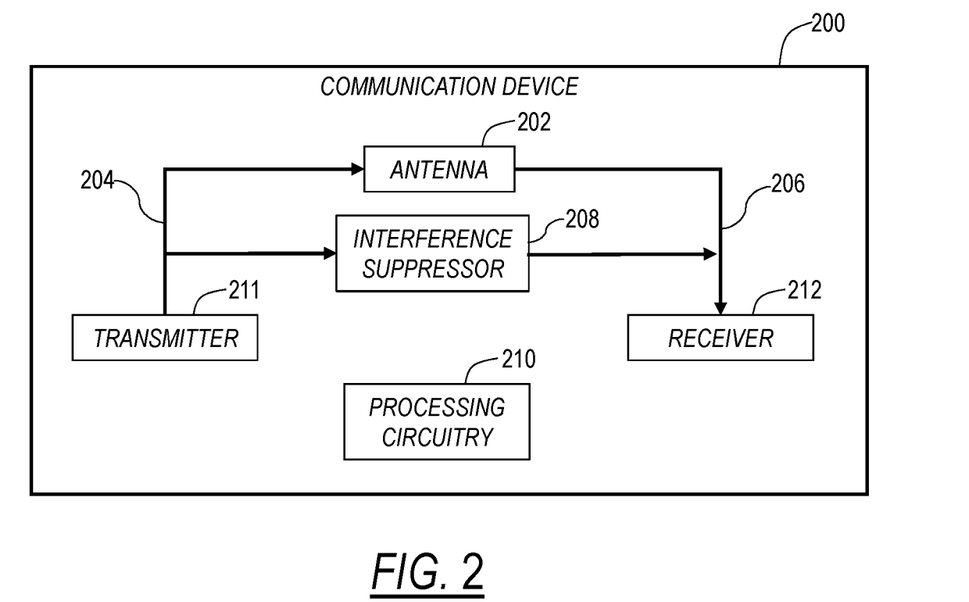
FIG. 2 is a block diagram of an example of a communication device.

Referring to FIG. 2, an example of communication device 200 useful in such a communication network 100 and other types of communication networks will now be described.

The communication device 200 includes at least one antenna 202 in signal communication with a transmit signal path 204 and a receive signal path 206. The communication device 200 also includes an interference suppressor 208 and processing circuitry 210. In the communication network 100, the base stations 102 and mobile units 104 may be equipped with a communication device 200 described here.

The antenna 202 may be a radio antenna capable of transmitting and receiving radio signals. Conventional antennae may be used to serve this purpose. In some examples of the communication device 200, a single antenna can perform the transmit and receive functions of the communication device 200. In other examples, the antenna 202 may be composed of a separate transmit antenna and a receive antenna, or an antenna array with multiple apertures.

The transmit signal path 204 and receive signal path 206 are signal propagation pathways through which a transmitted signal and a received signal travels, respectively. These pathways may include conventional coaxial lines, waveguides, directional couplers, and signal conditioning equipment. The transmitted signal may be generated by a radio transmitter 211, travel through the transmitted signal path 204, and be transmitted from the antenna 202. The received signal may be received by the antenna 202, travel through the receive signal path 206, and be received by a radio receiver 212.

The transmit signal path 204 and receive signal path 206 are operable simultaneously at the same frequency. This permits them to transmit and receive at the same frequency at the same time so that the communication device 200 is a STAR device. In a conventional radio, this is not possible because the receive signal path 204 will receive interference from the signal being transmitted via the transmit signal path 204.

The components of the communication device 200 may vary depending on its purpose. Those skilled in the art will understand how to make the communication device 200 and/or modify an existing conventional device to transform it into a communication device 200 after having the benefit of reading this disclosure.

To permit simultaneous transmission and reception at the same frequency, the interference suppressor 208 is operable to cancel interference noise from the transmit signal path 204 in the receive signal path 206 over an interference-suppressed band. This effectively reduces same frequency interference between the transmit signal path 204 and receive signal path 206 so that the receiver 212 can hear the desired transmission from a different communication device 200 rather than interference from the same communication device's 200 transmitted signal.

As used herein, "noise" refers to the background signal at the receiver 212 at the frequency range of interest prior to interference suppression. Interference suppression reduces the noise by suppressing interference caused by a signal being transmitted at the same time and same frequency as a signal that is being received.

Interference suppressors 208 useful for simultaneous transmit and receive devices are known and may be used as the interference suppressor 208 discussed here. Examples of such interference suppressors are described by Nwankwo et al in "A Survey of Self-Interference Management Techniques for Single Frequency Full Duplex Systems," *IEEE Access*, Vol. 6, pp. 30242-30268 (2018). Other examples of interference suppressors 208 that may be used in communication devices 200 are disclosed in U.S. Pat. Nos. 7,633,435, 8,879,433, 9,209,840, 9,461,698, 9,692,469, 10,218,490, and EP 2868004. The type of communication device 200 and interference suppressor 208 giving it STAR capability is not limited to any particular STAR device. Conventional STAR devices may be used and adapted to function with the network 100 using the initiation protocols described herein.

The problem with using simultaneous transmit and receive communication devices in a network is that no protocol is currently in place for initiating a communication between communication devices 200 operating in the network 100 as there would be with conventional radio communication devices in a cellular network, for example. The processing circuitry 210 is configured to provide this function.

Figure 3:
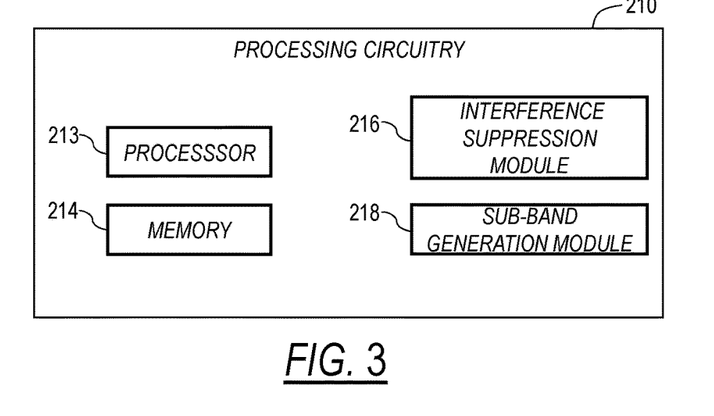
FIG. 3 is a block diagram of an example of processing circuitry.
Figure 4:
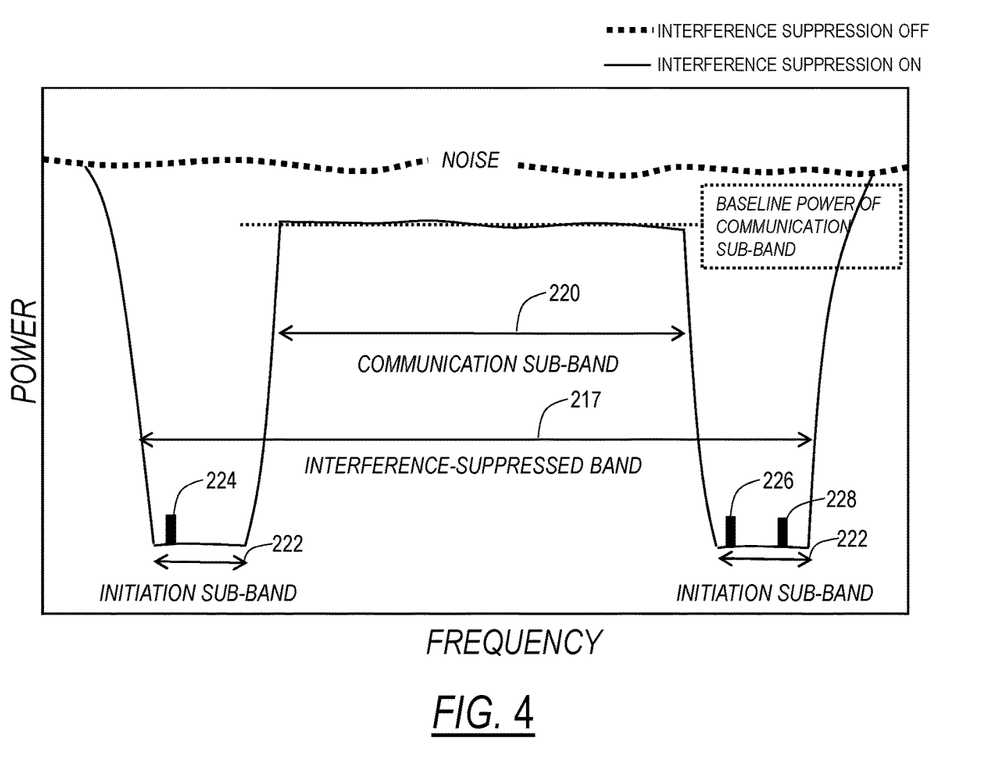
FIG. 4 is a graph illustrating different bands and sub-bands for communication in the network.

Referring to FIG. 3, the processing circuitry 210 includes a computer processor 213 and machine readable memory 214 that stores program instruction executed by the processor 213. Referring to FIGS. 2-4, the processing circuitry 210 is configured to generate a communication sub-band 220 and an initiation sub-band 222 within the interference-suppressed band 217. The initiation sub-band 222 may have a lower bandwidth than the communication sub-band 220 and may operate at a lower power than the communication sub-band 220. As illustrated in FIG. 4, the interference suppression relative to the background noise, labeled in FIG. 4, over the initiation sub-band 222 may be greater than the interference suppression relative to the background noise over the communication sub-band 220. The power at which the initiation sub-band 222 and communication sub-band 220 operate is within the background noise power, which makes communications less detectable by third parties.

The processing circuitry 210 is also configured to transmit and receive over the initiation sub-band 224 and transmit and receive simultaneously at the same frequency over the communication sub-band 220 as described below.

As illustrated in FIG. 4, the interference-suppressed band 217 is the band or frequency range over which the interference suppressor 208 and interference suppression module 216 operate. In a specific example, the interference suppressor 208 operates over an instantaneous bandwidth of up to 1 GHz over the 3 MHz to 60 GHz range.

Referring to FIGS. 3 and 4, an interference suppression module 216 includes program instructions that defines the interference-suppressed band 217, which is the band over which the interference suppressor 208 operates. For example, if the interference suppressor 208 operates over a range of 1 GHZ, the interference-suppressed band is the 1 GHz range in which the interference suppressor 208 cancels interference from the transmit signal path 204 in the receive signal path 206.

A sub-band generation module 218 generates a communication sub-band 220 and an initiation sub-band 222 within the interference-suppressed band 217.

The initiation sub-band 222 has a lower bandwidth than the communication sub-band 220 and may operate at a lower power than the communication sub-band 220. The bandwidth of the communication sub-band 220 is at least 75% of the bandwidth of the interference-suppressed band 217.

The initiation sub-band 222 may be distributed over two separate bands within the interference-suppressed band 217. The initiation sub-band 222 may include a first frequency range that is higher than the communication sub-band 220 and a second frequency range that is lower than the communication sub-band 220.

The communication sub-band 220 may operate at a lower power than the noise over the interference-suppressed band 217. This function makes communications within the communication sub-band 220 extremely difficult to detect for conventional radio devices, thereby permitting secure communications.

The initiation sub-band 222 may be used by the processing circuitry 210 for transmitting a polling signal 224 to other communication devices 200 in the network 100. The polling signal 224 informs the other communication devices 200 that the communication device transmitting the polling signal 224 desires to transmit/receive data to/from another communication device 200 via the communication sub-band 220.

The polling signal 224 may have many different forms including one or more pulses of a pre-defined power, duration, sequence, and delay time between pulses in a sequence, and modulation schemes. If desired, each communication device 200 may have its own unique polling signal 224, that functions like an identification of that particular communications device 200. Because the polling signal 224 is transmitted in the initiation sub-band 222, it can have lower power but still be detectable by the other communication devices 200. The polling signal 224 may be relatively low power, such as being about 10% power above the noise floor of the frequency the polling signal 224 occupies.

The second communication device 200 that receives the polling signal 224 may transmit its own polling signal 224 at the same frequency at the same time as the first communication device 200. The communication devices 200 in the network 100 are able to simultaneously transmit their own polling signals 224 and receive polling signals 224 from other communication devices 200 at the same time and at the same frequency.

The initiation sub-band 222 may be also used by the processing circuitry 210 for transmitting an interrogation signal 226 to another communication devices 200 in the network that acknowledged receiving the polling signal 224. The interrogation signal 226 is the second stage of initiating communications over the communication sub-band 220. The interrogation signal 226 may be relatively low power, such as being about 10% power above the noise floor of the frequency the interrogation signal 226 occupies.

The interrogation signal 226 tells communication device 200 communicating within the network 100 after having exchanged polling signals 224 that each of the communication devices 200 is permitted to communicate within the network 100.

The interrogation signal 226 may have many different forms including one or more pulses of a pre-defined power, duration, sequence, and delay time between pulses in a sequence, and modulation schemes. If desired, each communication device 200 may have its own unique interrogation signal 226, that further identifies that particular communications device 200 beyond the polling signal 224. Because the interrogation signal 226 is transmitted in the initiation sub-band 222, it can have lower power but still be detectable by the other communication devices 200.

The interrogation signal 226 may be transmitted at a different frequency than the polling signal 224. The communication devices 200 in the network 100 are able to simultaneously transmit their own interrogation signals 226 and receive interrogation signals 226 from other communication devices 200 at the same time and at the same frequency.

After two communication devices 200 have exchanged interrogation signals 226, they are able to confirm each is permitted to communicate within the network 100, the initiation sub-band 222 may be also used by the processing circuitry 210 for transmitting an authentication signal 228 to the other communication device 200.

The authentication signal 228 allows each communication device 200 to identify the communication device 200 attempting to communicate with it. This may be accomplished by each communication device 200 having stored thereon the unique authentication signal 228 of each communication device 200 authorized to use the network 100.

The authentication signal 228 may have many different forms including one or more pulses of a pre-defined power, duration, sequence, and delay time between pulses in a sequence, and modulation schemes. Because the authentication signal 228 is transmitted in the initiation sub-band, it can have lower power but still be detectable by the other communication devices 200.

The authentication signal 228 synchronizes the communication devices 200 so that they are operating at substantially the same time scale. The processing circuitry 210 generates a timer that defines the time the communication devices 200 will be able to communicate over the communication sub-band 220. The timer may set a countdown time defined by a timing source. The timing source may be an internal clock or an external clock such as a Global Positioning System time clock.

The authentication signal 228 may be transmitted at a different frequency than the polling signal 224 or interrogation signal 226. The communication devices 200 in the network 100 are able to simultaneously transmit their own authentication signals 228 and receive authentication signals 228 from other communication devices 200 at the same time and at the same frequency.

Once the countdown timer ends, both communication devices 200 are able to transmit and receive data over the wideband communication sub-band 220. Because both devices are able to transmit and receive at the same frequency, the communication sub-band 220 allows for full duplex communication at the same frequency. Unlike conventional radio networks, it is not necessary to divide the communication sub-band 220 into a separate transmit and a receive bands. It is also not necessary to use guard bands.

Figure 5:
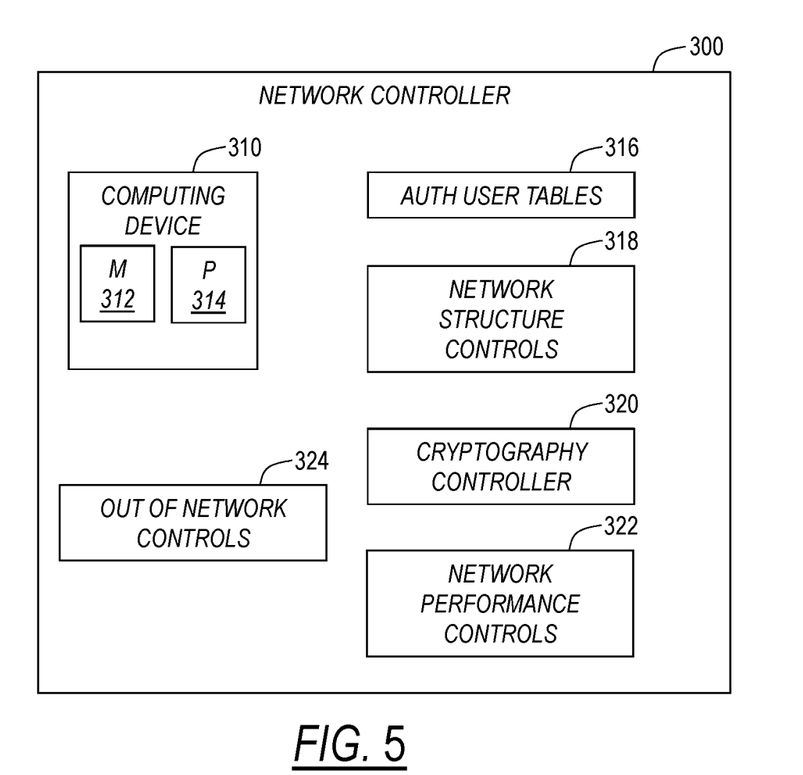
FIG. 5 is a block diagram of an example of a network controller.

Referring to FIG. 5, the communication devices 200 in the network 100 are in communication with a network controller 300. The network controller includes a computing device 310 having machine readable memory 312 storing program instructions that a computer processor 314 executes to perform control operations on the network 100. The network controller 300 may be a dedicated device physically separate from any of the communication devices 200 or it may be part of one or more of the communication devices 200.

The memory 312 stores authorized user tables 316. The authorized user tables 316 include a list of the communication devices 200 that are authorized to communicate over the network 100. It may also store the polling signal 224 and interrogation signal 226 unique to each communication device 200 so that they can be used to identify a particular communication device 200.

The memory 312 stores network structure controls 318. The network structure controls 318 may include the network spectrum definition, channel loading protocols, Delay or Disruption Tolerant Network (DTN) protocols and priority, and Software Defined Radio (SDR) and Software Defined Networking (SDN) protocols for the network 100.

The memory 312 stores a cryptography controller 320. The cryptography controller includes program instructions to assign frequency key codes and perform over the air re-keying of the communication devices 200.

The memory 312 stores network performance controls 322. The network performance controls 322 includes program instructions to monitor network performance and perform network optimization routines. The network performance controls 322 also include program instructions executed by the communication devices 200 for operating the interference suppression module 216 and sub-band generation module 218.

The memory 312 stores out of network controls 324. The out of network controls 324 include program instructions for handling communications from devices that are not capable of simultaneously transmitting and receiving at the same frequency.

The network controller 300 is in communication with the communication devices 200. Network control functions may be synchronized over similar or dissimilar networks via secure messaging. In this case, being synchronized means the network controller 300 shares its data and functions with communications devices 200 across the network.

Figure 6:
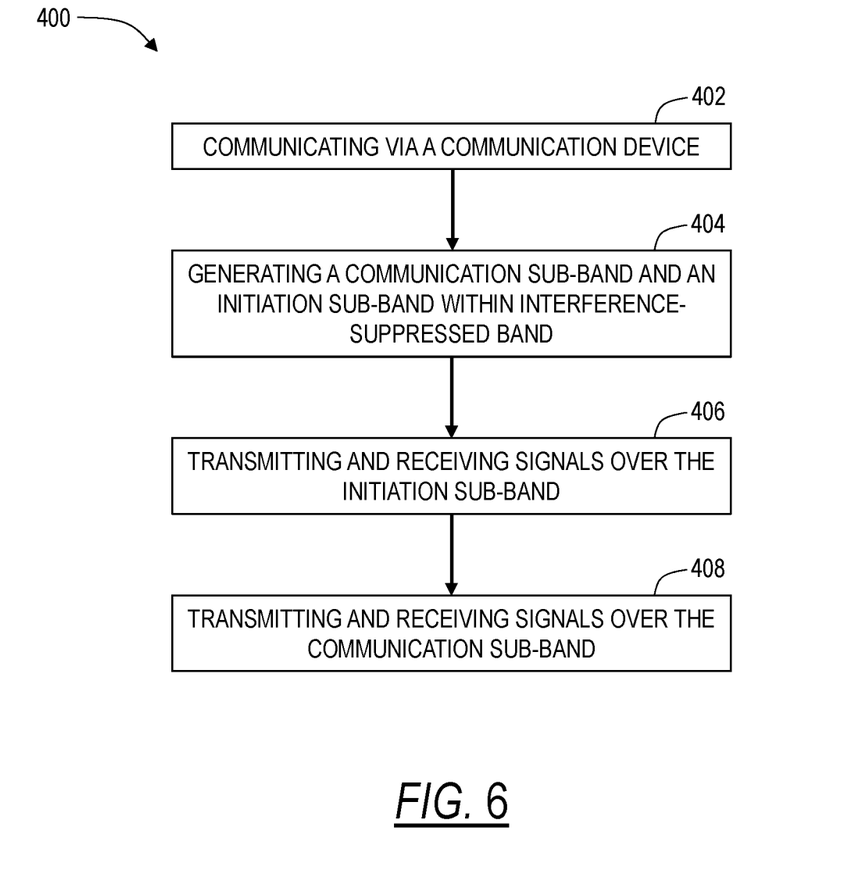
FIG. 6 is a flow diagram of an example of a communication method.

Referring to FIG. 6, an example of communication method 400 that may employ any of the aforementioned features is now described.

At block 402, the method 400 includes communicating via a communication device, such as communication device 200 having a transmit signal path 204 and a receive signal path 206. The transmit signal path 204 and receive signal path 206 are operable to transmit and receive simultaneously at the same frequency over the interference-suppressed band 217.

At block 404, the method 400 further includes generating a communication sub-band 220 and an initiation sub-band 224 within the interference-suppressed band 217. The initiation sub-band 224 has a lower bandwidth than the communication sub-band 220.

At block 406, the method 400 further includes transmitting and receiving signals over the initiation sub-band 224. This may be achieved as described above.

At block 408, the method 400 further includes transmitting and receiving signals over the communication sub-band 220. Communication may be achieved over the initiation sub-band 224 and communication sub-band 220 between different communication devices 200 simultaneously and at the same frequency.

Figure 7:
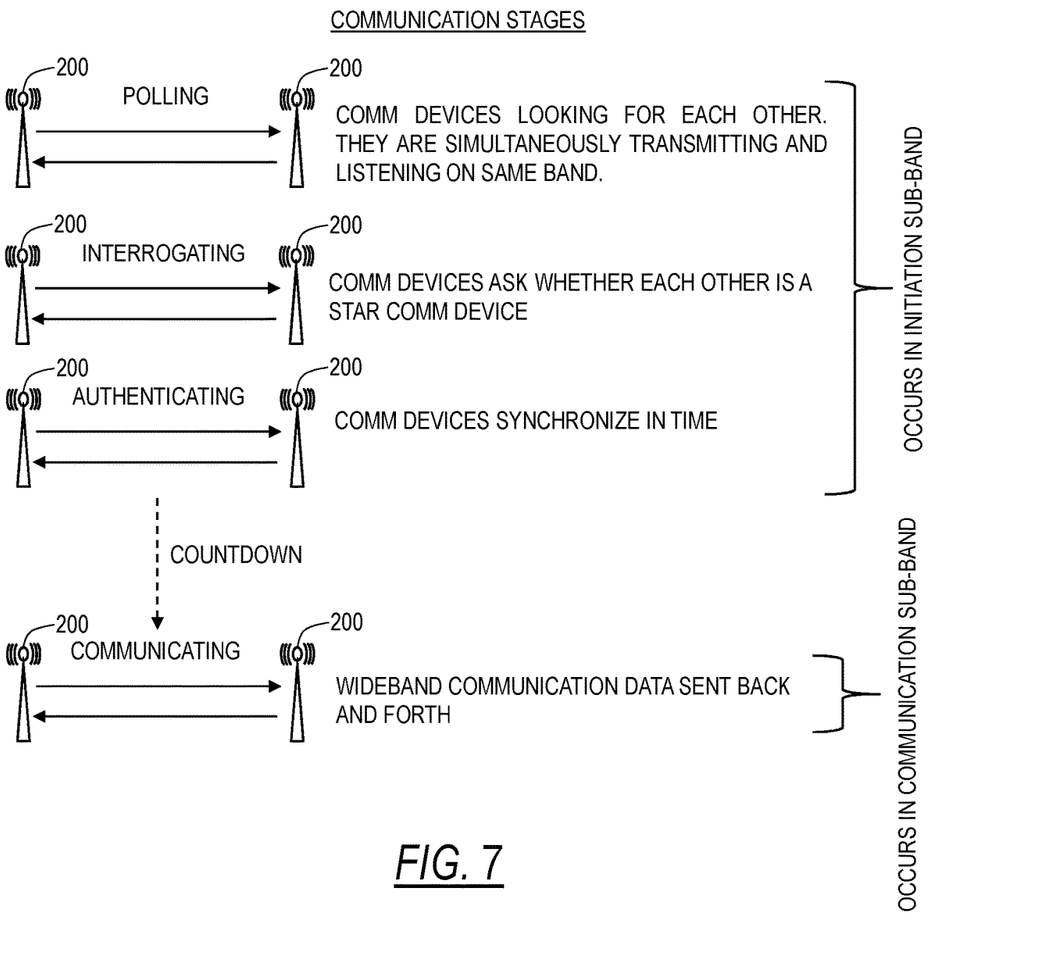
FIG. 7 is a flow diagram of another communication method.

Referring to FIG. 7, another example of a communication method is described in terms of exemplary stages of initiating data communication between communication devices 200 in the network 100. These stages are executed by the communication devices 200 using program instructions executed by their processing circuitry 210.

In the polling stage, communication devices 200 are transmitting their respective polling signals 224, effectively looking for another communication device 200 with which to communicate. The polling signals 224 may be transmitted and received simultaneously at the same frequency.

In the interrogating stage, subsequent to the polling stage, the communication devices 200 exchange their respective interrogation signals 226, which may be transmitted and received simultaneously at the same frequency. During the interrogating stage, the communication devices 200, are able to confirm whether the other communication device 200 is capable of simultaneous transmission and reception (STAR) at the transmitted and received simultaneously at the same frequency.

In the authenticating stage, subsequent to the interrogating stage, the communication devices 200 transmit and receive their respective authentication signals 228, which may be transmitted and received simultaneously at the same frequency. During this stage, the communication devices 200 become time synchronized and the timing countdown begins.

After the timing countdown ends, the communicating stage commences. During the communication stage, the communication devices 200 transmit and receive data between each other over the communication sub-band 220. During this stage, large amount of data may be exchanged because the communication sub-band 220 has a large bandwidth. During the communication stage, the communication devices 200 may transmit and receive data simultaneously at the same frequency.

Figure 8:
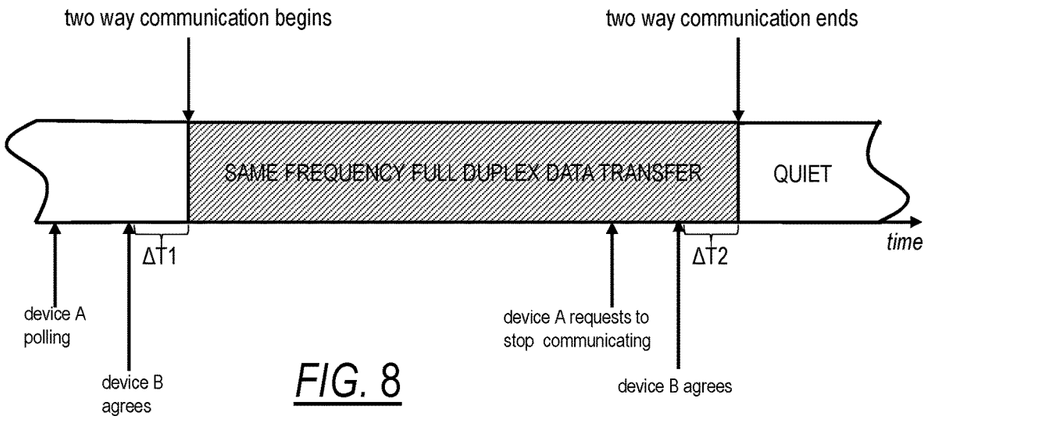
FIG. 8 is a time-based summary of the timeline of initiating and making communications in the network.

Referring to FIG. 8, parts of the communication stages are summarized as a function of time. Beginning at the earlier time on the left, communication device A 200 enters the polling stage and begins searching for another communication device B 200 with which to communicate. After the interrogation stage, communication device B 200 agrees to communicate with communication device A 200. During the authentication stage, the countdown, represented by ΔT1 begins. At the end of the countdown, two way same frequency data communications begin on the communication sub-band 220.

After communication device A 200 has completed its communication, it requests to stop communicating by sending communication device B 200 a stop communications signal. Once communication device B 200 agrees, another countdown, represented by ΔT2 begins. After the second countdown expires, two way communication ends and the communication sub-band 220 goes quiet.

The stop communication signal may also be transmitted when insufficient quality of service, link quality, or signal strength is detected by a communication device 200 and/or network controller 300.

In some implementations, the devices, systems, and methods described here enable full duplex, wideband (>500 MHZ) communications within the same frequency at the same time through the use of STAR technology. High data rate (wide bandwidth), full duplex communication on the same frequency with almost no latency impact is a significant spectrum management and communications security improvements. Communications using STAR technology creates a fundamentally new approach to secure communications.

The technology discussed here may be used in the telecommunication abstraction layers defined by the International Organization for Standardization in their Open Sessions Connection (OSI) model.

Traditional communications systems have relied on various simplex (one user on a single frequency, channel or time slot at one time) methods for establishing, authenticating and maintaining communications. Since full duplex STAR communications set a new paradigm for the physical (base or first) layer of the OSI model, the existing methods and technologies for several of the other layers may become obsolete as the core assumption of simplex communication is no longer applicable.

The technology described here includes new physical and datalink initiation methodology for wideband simultaneous transmit and receive communications. The methodology is designed as a base abstraction layer of communications protocols for STAR as applied to static and mobile ad hoc network (MANET) communications between two or more STAR-enabled communication devices 200.

In some examples, the full duplex STAR communications over the communication sub-band 220 will not occupy more than 400 megahertz (MHz) of a 500 MHz wideband STAR system, or 900 MHz of a 1 gigahertz (GHz) STAR system. The remaining 100 MHz is not required as a guard band, but rather is employed as the signaling space (free space) for initiating secure physical and datalink initiation activity in the initiation sub-band 222.

Due to the deep self-interference suppression provided by the communication devices 200, the signals over the initiation 222 and communication 220 sub-bands may be contained within the background noise. This makes communications over the network 100 secure because they are extremely difficult to detect. The polling signals 224, interrogation signals 226, and authentication signals 228 may be power modulated to be just above or at the noise floor for the radio frequency environment that they occupy. If they were detected by a third party with conventional radio communication equipment, they would appear to be a spurious, short duration noise signal. Since they do not operate in the same frequencies as the communication sub-band, they could not be readily identified as a signal from a communication device 200.

In some example uses, the devices, systems, and methods allow for wideband communications between two or more different communication devices 200 at the same time and on an overlapping frequency band, which may be the communication sub-band 220.

Figure 9:
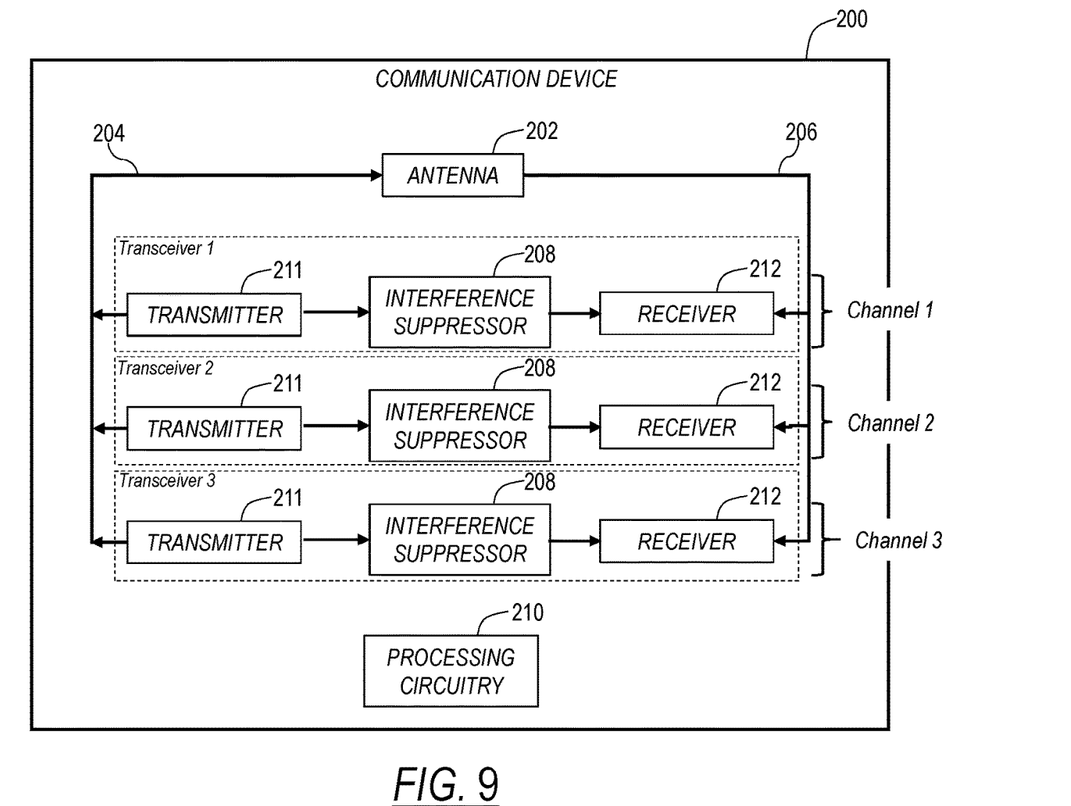
FIG. 9 is a block diagram of another example of the communication device.

Referring to FIG. 9, another example of a communication device 200 that can be used in a network, such as the network 100 of FIG. 1 for example, is now described.

Compared to the communication device 200 in FIG. 2, the communication device in FIG. 9 has three channels (channel 1, channel 2, and channel 3). The three channels include a transmitter 211, interference suppressor 208, and receiver 212, each forming a respective transceiver. The three channels also communicate with the antenna 202 via the transmit signal path 204 and receive signal path 206.

These channels, individually, function as described above in connection with FIGS. 3-4 with each having its own interference suppressed band 217, initiation sub-band 222, and communication sub-band 220. At least one of the channels is used as a service channel. The service channel can have many different functions. One of its functions is to perform the functions of the polling, interrogating, and authenticating stages described above. The service channel may also be used for network resiliency operations and for network control operations. If desired, the communication sub-band 220 of the service channel may be used for full duplex wideband communications to decrease the hop count between nodes in the network 100. The service channel may also be used as a network multicast, broadcast, and data mule between nodes.

The other two of the three channels are communication channels. The communication channels are used for wideband full duplex communications over the communication sub-band 220 of these channels, respectively, once a node has been permitted access to the network 100 through the polling, interrogating, and authenticating stages.

The frequency band of the service channel and communication channels do not have to be adjacent in the radio frequency spectrum, but higher spectral efficiency can be achieved if they are because guard bands are not necessary. If the service channel's frequency band is dissimilar from that of the communication channels, this can increase the security of initiating the communication through frequency diversity.

The communication device 200 of FIG. 9 is not limited to having only three channels. Additional channels may be added, depending on the desired performance. Having more channels permits a given communication device 200 to have wideband full duplex communications with more communication devices 200 in the network 100.

Figure 10:
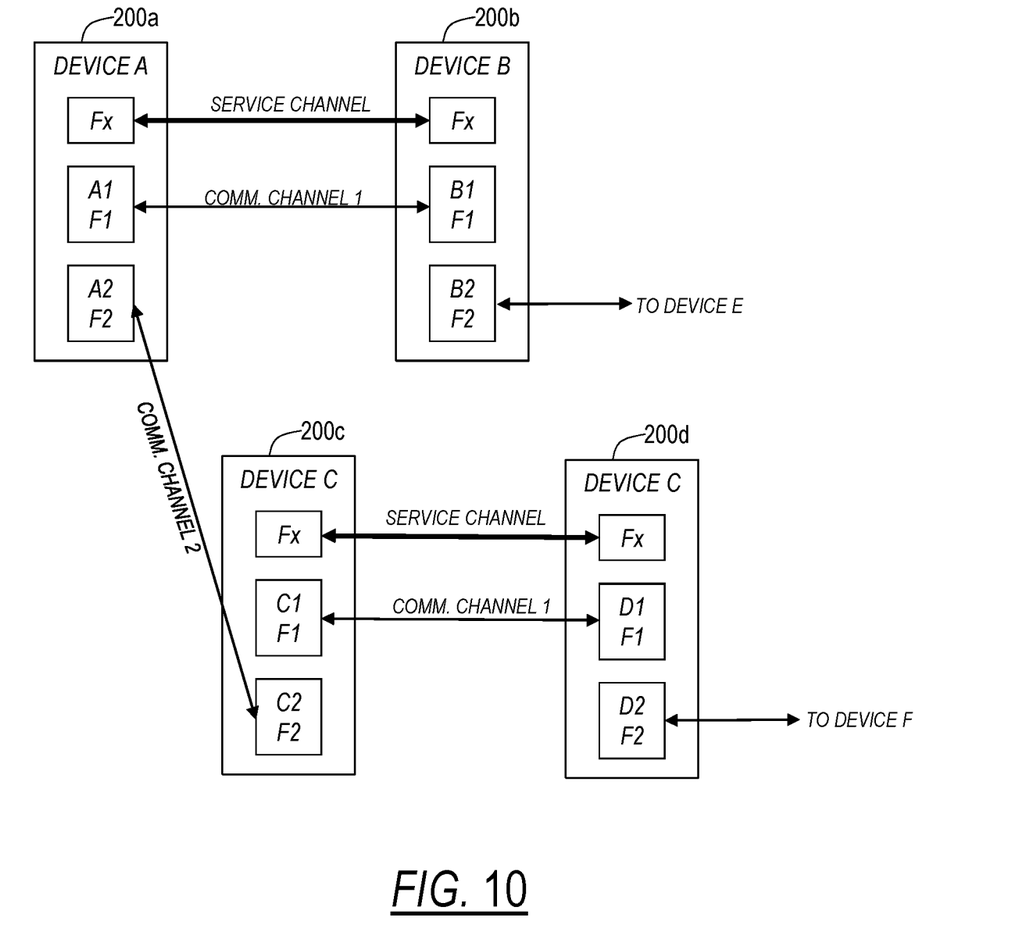
FIG. 10 is a block diagram illustrating four communication devices communicating with one another.

Referring to FIG. 10, a plurality of communication devices of FIGS. 9 (200a, 200b, 200c, and 200d) shown to illustrate how the different channels can operate in an example of their use. Here, "Fx" represents the service channel, "F1" represents the first communication channel, and "F2" represents the second communication channel.

In FIG. 10, communication devices 200a and 200b communicate their polling, interrogating, and authenticating signals over the service channel (Fx). Once the communication is authenticated, they then open wideband communications over communication channel F1. At the same time, communication device 200a is communicating with communication device 200c over communication channel F2. Communication devices 200c and 200d are also communicating over the service channel and communication channel F1. Communication channel F2 on communication devices 200b and 200d are able to communicate with yet another communication device over communication channel F2 as represented by the dashed arrows. This functionality permits a network of STAR communications to occur at the same time and on overlapping bands if necessary.

Figure 11:
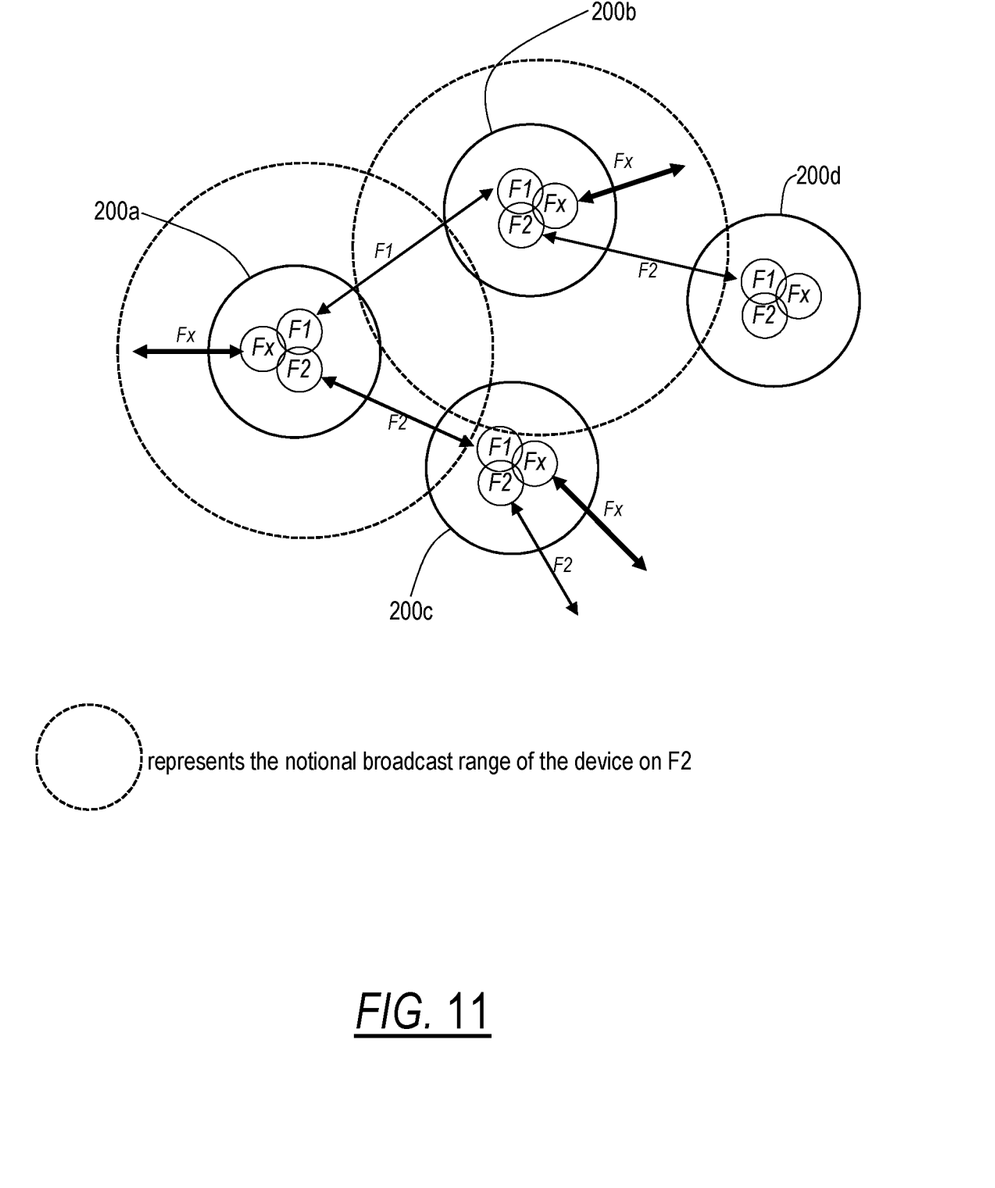
FIG. 11 is a block diagram illustrating full duplex communications between four communication devices on overlapping frequency bands.

FIG. 11 is a spatial representation of multiple communication devices 200a-200d communicating in the network as explained above. The dashed circles represent the notional broadcast range of the respective communication device on channel F2. The frequency bands used for Fx, F1, and F2 on different communication devices 200 may overlap with those of other communication devices even though the devices are in close spatial proximity due to the interference suppression on the channels. This permits many different devices in the same network and in close proximity to engage in wideband STAR communications on overlapping frequency bands at the same time.

This frequency overlap capability may be deployed on specialized communication devices 200 with transceivers and antennas (omni-directional and/or directional) designed for STAR capability. The frequency overlap capability can also be applied to legacy radios modified to accept STAR functionality. Legacy radios with STAR functionality are able to create an interference suppressed band for the STAR capability to be functional.

In a network with a mix of two-dimensional fixed sites or base stations 102 supporting transient mobile units 104 such as the communication devices 200, the frequency overlap capability may be controlled by the fixed base stations' 102 software-defined networking functions to manage frequency allocation, radiated power and network entry, hand-off and network departure functions. The fixed base station 102 may be connected to terrestrial telecommunications services such as the Internet or the like via wired or wireless links. The fixed base stations 102 may have secure access to network management functions. Their less stringent space, weight and power requirements allow for increased capacity in network control function processing and communications with network management assets.

Fixed base stations 102 may also provide an enhanced opportunity for networking between different STAR networks. A fixed base station 102 may accommodate several STAR/non-STAR-enabled radio stations from different networks and provide a communications and network bridging function.

The network controller 300 may perform the control functions in a network such a that described in connection with FIGS. 8-11.

STAR communications enable some aspects of network control to be conducted and optimized due to STAR's exclusionary nature to non-STAR equipped communication devices. The unique physical layer session establishment methodology or initiation protocol identifies authorized communication devices 200 at the hardware and radio frequency spectrum layer.

This disclosure describes certain example embodiments, but not all possible embodiments of the devices, systems, and methods. Where a particular feature is disclosed in the context of a particular embodiment, that feature can also be used, to the extent possible, in combination with and/or in the context of other embodiments. The devices and associated methods may be embodied in many different forms and should not be construed as limited to only the embodiments described here.

That which is claimed is:

1. A communication device comprising:
   a transmit signal path and a receive signal path, the transmit signal path and receive signal path being operable to transmit and receive simultaneously at the same frequency;
   a first channel in the transmit signal path and receive signal path, the first channel being configured to communicate with a first communication device over a first interference suppressed band;

a second channel in the transmit signal path and receive signal path, the second channel being configured to communicate with a second communication device over a second interference suppressed band; and processing circuitry configured to generate a communication sub-band and an initiation sub-band in the first channel, the initiation sub-band having a lower bandwidth than the communication sub-band and operating at a lower power than the communication sub-band.

2. The communication device of claim 1, wherein the first interference suppressed band and second interference suppressed band overlap.

3. The communication device of claim 1, further comprising a third channel in the transmit signal path and receive signal path, the third channel being configured to initiate communication between the first communication device and second communication device by sending and receiving a polling signal.

4. The communication device of claim 1, further comprising a first transceiver that operates the first channel and a second transceiver that operates the second channel.

5. The communication device of claim 1, further comprising a first transceiver that operates the first channel and a second transceiver that operates the second channel, the first transceiver including a first interference suppressor that suppresses simultaneously transmitted and received interference in the first transceiver, the second transceiver including a second interference suppressor that suppresses simultaneously transmitted and received interference in the second transceiver.

6. A communication method comprising:

communicating via a communication device having a transmit signal path and a receive signal path, the transmit signal path and receive signal path being operable to transmit and receive simultaneously at the same frequency;

communicating with a first remote communication device over a first interference suppressed band using a first channel in the transmit signal path and receive signal path;

communicating with a second remote communication device over a second interference suppressed band using a second channel in the transmit signal path and receive signal path; and generating a communication sub-band and an initiation sub-band in the first channel, the initiation sub-band having a lower bandwidth than the communication sub-band and operating at a lower power than the communication sub-band.

7. The communication method of claim 6, wherein the first interference suppressed band and second interference suppressed band overlap.

8. The communication method of claim 6, further comprising a third channel in the transmit signal path and receive signal path, the third channel being configured to initiate communication between the first remote communication device and second remote communication device by sending and receiving a polling signal.

9. The communication method of claim 6, wherein a first transceiver operates the first channel and a second transceiver operates the second channel.

10. The communication method of claim 6, wherein a first transceiver operates the first channel and a second transceiver operates the second channel, the first transceiver including a first interference suppressor that suppresses simultaneously transmitted and received interference in the first transceiver, the second transceiver including a second interference suppressor that suppresses simultaneously transmitted and received interference in the second transceiver.

11. A communication method comprising:

operating a network of simultaneous transmit and receive (STAR) communication devices that communicate with each other simultaneously on a common frequency band by:

executing a first channel on the frequency band, the first channel having interference between a first channel transmitter and a first channel receiver suppressed by a first interference suppressor;

executing a second channel on the frequency band, the second channel having interference between a second channel transmitter and a second channel receiver suppressed by a second interference suppressor; and generating a communication sub-band and an initiation sub-band in the first channel, the initiation sub-band having a lower bandwidth than the communication sub-band and operating at a lower power than the communication sub-band.

12. The communication method of claim 11, wherein a network controller executes the first channel and second channel by providing control signals to the communication devices.

13. The communication method of claim 11, further comprising executing a third channel on the frequency band, the third channel having interference between a third channel transmitter and a third channel receiver suppressed by a third interference suppressor, wherein a network controller provides control signals to the communication devices over the third channel.

14. The communication method of claim 11, further comprising:

generating a first communication sub-band and a first initiation sub-band in the first channel, the first initiation sub-band having a lower bandwidth than the first communication sub-band and operating at a lower power than the first communication sub-band; and generating a second communication sub-band and a second initiation sub-band in the second channel, the second initiation sub-band having a lower bandwidth than the second communication sub-band and operating at a lower power than the second communication sub-band.

15. The communication method of claim 11, wherein a network controller executes the first channel and second channel by providing control signals to the communication devices over a third channel, the first channel, second channel, and third channel being on the same frequency band.

16. The communication method of claim 11, wherein the first channel and second channel occupy the same frequency band.

17. The communication method of claim 11, wherein the STAR communication devices communicate full duplex data transfers at the same frequency.

\* \* \* \* \*